United States Patent
Takagi et al.

(10) Patent No.: US 11,358,610 B2
(45) Date of Patent: Jun. 14, 2022

(54) VEHICLE ALERT APPARATUS

(71) Applicant: TOYOTA JIDOSHA KABUSHIKI KAISHA, Toyota (JP)

(72) Inventors: Toshihiro Takagi, Nisshin (JP); Yasutaka Matsunaga, Nisshin (JP); Masumi Fukuman, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 17/066,117

(22) Filed: Oct. 8, 2020

(65) Prior Publication Data

US 2021/0107506 A1 Apr. 15, 2021

(30) Foreign Application Priority Data

Oct. 11, 2019 (JP) .............................. JP2019-187518

(51) Int. Cl.
*B60Q 1/00* (2006.01)
*B60W 50/14* (2020.01)
*B60W 30/095* (2012.01)
*B60W 40/105* (2012.01)

(52) U.S. Cl.
CPC ........ *B60W 50/14* (2013.01); *B60W 30/0956* (2013.01); *B60W 40/105* (2013.01); *B60W 2050/143* (2013.01); *B60W 2050/146* (2013.01); *B60W 2540/18* (2013.01); *B60W 2554/20* (2020.02); *B60W 2554/80* (2020.02)

(58) Field of Classification Search
CPC ............ B60W 50/14; B60W 30/0956; B60W 40/105; B60W 2050/143; B60W 2050/146; B60W 2540/18; B60W 2554/20; B60W 2554/80
USPC ........................................................ 340/435
See application file for complete search history.

(56) References Cited

U.S. PATENT DOCUMENTS

| 9,182,761 B2 * | 11/2015 | Fujita .................... B60W 30/09 |
| 2007/0282532 A1 * | 12/2007 | Yamamoto .......... B60R 21/0134 701/96 |
| 2017/0344022 A1 * | 11/2017 | Shima .................. G05D 1/0231 |

FOREIGN PATENT DOCUMENTS

JP          2019-032744 A       2/2019

* cited by examiner

*Primary Examiner* — Tai T Nguyen
(74) *Attorney, Agent, or Firm* — Sughrue Mion, PLLC (57) ABSTRACT

A vehicle alert apparatus acquires an object distance between an object and a vehicle, presumes a predicted moving route of the vehicle when the object distance is shorter than or equal to a threshold object distance. The vehicle alert apparatus calculates a collision distance which the vehicle has moves along the predicted moving route until the vehicle collides with the object or the vehicle has moved to a position closest to the object when determining that the vehicle potentially collides with the object, based on the predicted moving route. The vehicle alert apparatus performs a first alert when the collision distance is larger than a threshold collision distance. The vehicle alert apparatus performs a second alert having a higher alert level of alerting the driver than the alert level of the first alert when the collision distance is shorter than or equal to the threshold collision distance.

13 Claims, 9 Drawing Sheets

VEHICLE ALERT APPARATUS

BACKGROUND

Field

The invention relates to a vehicle alert apparatus which alerts a driver of a vehicle when a distance to an object is shorter than or equal to a threshold distance.

Description of the Related Art

There are known vehicle alert apparatuses to alert a driver of a vehicle when a relationship in position between the vehicle and an object, satisfies an alert condition. One of the known vehicle alert apparatuses generates alerts sounds with an intermittent sound pattern when a distance between the object and the vehicle (an object distance) is longer than a continuous sound start distance and shorter than or equal to an output start distance (for example, see JP 2019-32744 A). The known vehicle alert apparatus generates the alert sound with a continuous sound pattern when the object distance is shorter than or equal to the continuous sound start distance.

When the object distance is relatively short, a level of a collision potential that the vehicle potentially collides with the object, may be low. The known vehicle alert apparatus generates the alert sound with the continuous sound pattern having an alert level higher than the alert level of the intermittent sound pattern when the object distance is shorter than or equal to the continuous sound start distance, independently of the level of the collision potential. If the alert having the high alert level is performed when the level of the collision potential is low, the alert may bother a driver of the vehicle.

SUMMARY

The invention has been made for solving above-mentioned problems. An object of the invention is to provide a vehicle alert apparatus which performs an alert with a high alert level only when a potential level of colliding with the object is relatively high.

A vehicle alert apparatus according to the invention is installed in a vehicle. The vehicle alert apparatus according to the invention comprises (i) a vehicle moving speed sensor which detects a vehicle moving speed corresponding to a moving speed of the vehicle, (ii) a steering angle sensor which detects a steering angle of the vehicle, (iii) at least one detection sensor which detects information on at least one object in a predetermined detection area, and (iv) an electronic control unit which alerts a driver of the vehicle.

The electronic control unit is configured to (i) acquire the information on the at least one object detected by the at least one detection sensor as object information and (ii) acquire an object distance corresponding to a distance between the at least one object and the vehicle, based on the acquired object information. Further, the electronic control unit is configured to presume a predicted moving route of the vehicle, based on the vehicle moving speed and the steering angle when the object distance is shorter than or equal to a threshold object distance. Furthermore, the electronic control unit is configured to calculate a collision distance corresponding to a distance which the vehicle has moves along the predicted moving route until the vehicle collides with the at least one object or the vehicle has moved to a position closest to the at least one object when the electronic control unit determines that the vehicle potentially collides with the at least one object, based on the predicted moving route.

The electronic control unit is configured to perform a first alert when the collision distance is larger than a threshold collision distance. Further, the electronic control unit is configured to perform a second alert having a higher alert level of alerting the driver than the alert level of the first alert when the collision distance is shorter than or equal to the threshold collision distance.

According to the invention, the second alert having the alert level higher than the alert level of the first alert, is performed when the collision distance is shorter than or equal to the threshold collision distance, is satisfied. Thus, the second alert is performed only when a level of a collision potential that the vehicle potentially collides with the object, is high. Therefore, the second alert is not performed when the level of the collision potential is low. As a result, bothering the driver by the second alert can be prevented.

According to an aspect of the invention, the vehicle alert apparatus may further comprise (i) at least one camera sensor which takes images of a view surrounding the vehicle and acquires data on the taken images and (ii) a display which displays a vehicle surrounding image corresponding to an image of the view surrounding of the vehicle. In this aspect of the invention, the electronic control unit may be configured to (i) acquire image data corresponding to data on the images acquired by the at least one camera sensor, (ii) produce the vehicle surrounding image, based on the acquired image data, and (iii) display the produced vehicle surrounding image on the display. Further, the electronic control unit may be configured to perform the first alert by displaying a first alert display element on the display at a position in the vehicle surrounding image corresponding to the object distance with overlapping the vehicle surrounding image. Furthermore, the electronic control unit is configured to perform the second alert by displaying a second alert display element having the alert level higher than the alert level of the first alert display element, on the display at the position in the vehicle surrounding image corresponding to the object distance with overlapping the vehicle surrounding image.

According to this aspect of the invention, the driver can realize (i) a distance to the object which the driver should pay attention and (ii) the level of the collision potential by taking a look at the alert display element displayed on the vehicle surrounding image with overlapping the vehicle surrounding image.

According to another aspect of the invention, the vehicle alert apparatus may further comprise a speaker which generates alert sounds. In this aspect of the invention, the electronic control unit may be configured to perform the first alert by generating the alert sounds from the speaker with a first pattern. Further, the electronic control unit may be configured to perform the second alert by generating the alert sounds from the speaker with a second pattern having the alert level higher than the alert level of the first pattern.

According to this aspect of the invention, the driver can realize the level of the collision potential by the alert sound.

According to further another aspect of the invention, the electronic control unit may be configured to perform the first alert when the electronic control unit determines that the vehicle does not collide with the at least one object, based on the predicted moving route.

According to further another aspect of the invention, the electronic control unit may be configured to presume a vehicle body passing area corresponding to an area which a body of the vehicle has passed while the vehicle moves along the predicted moving route until the vehicle collides with the at least one object or the vehicle has moved to a position closest to the at least one object. In this aspect, the electronic control unit may be configured to determines that the vehicle potentially collides with the at least one object when the at least one object is in the vehicle body passing area.

According to further another aspect of the invention, the electronic control unit may be configured to acquire the object distance when the at least one object is a stationary object.

According to further another aspect of the invention, the electronic control unit may be configured to acquire the object distance when (i) the at least one object is a stationary object, and (ii) the vehicle moving speed is lower than or equal to a threshold speed.

According to further another aspect of the invention, the at least one object may include plural objects. In this aspect of the invention, the electronic control unit may be configured to perform the first alert by displaying the first alert display element on the display at the position in the vehicle surrounding image corresponding to the shortest object distance with overlapping the vehicle surrounding image when (i) the objects determined to potentially collide with the vehicle are at the same side of the vehicle, and (ii) the collision distances of all objects are longer than the threshold collision distance.

According to further another aspect of the invention, the at least one object may include plural objects. In this aspect of the invention, the electronic control unit may be configured to perform the second alert by displaying the second alert display element on the display at the position in the vehicle surrounding image corresponding to the object distance of the object having the shortest collision distance with overlapping the vehicle surrounding image when (i) the objects determined to potentially collide with the vehicle are at the same side of the vehicle, and (ii) the collision distances of all objects are smaller than or equal to the threshold collision distance.

According to further another aspect of the invention, the at least one object may include plural objects. In this aspect of the invention, the electronic control unit may be configured to perform the second alert by displaying the second alert display element on the display at the position in the vehicle surrounding image corresponding to the object distance of the object having the collision distance shorter than or equal to the threshold collision distance with overlapping the vehicle surrounding image when (i) the objects determined to potentially collide with the vehicle are at the same side of the vehicle, (ii) a part of the collision distances is longer than the threshold collision distance, and (iii) the remaining of the collision distances is smaller than or equal to the threshold collision distance.

According to further another aspect of the invention, the same side of the vehicle may include a left side and a right side of the vehicle.

Elements of the invention are not limited to elements of embodiments and modified examples of the invention described along with the drawings. The other objects, features and accompanied advantages of the invention can be easily understood from the embodiments and the modified examples of the invention.

DESCRIPTION OF THE EMBODIMENTS

Figure 1:
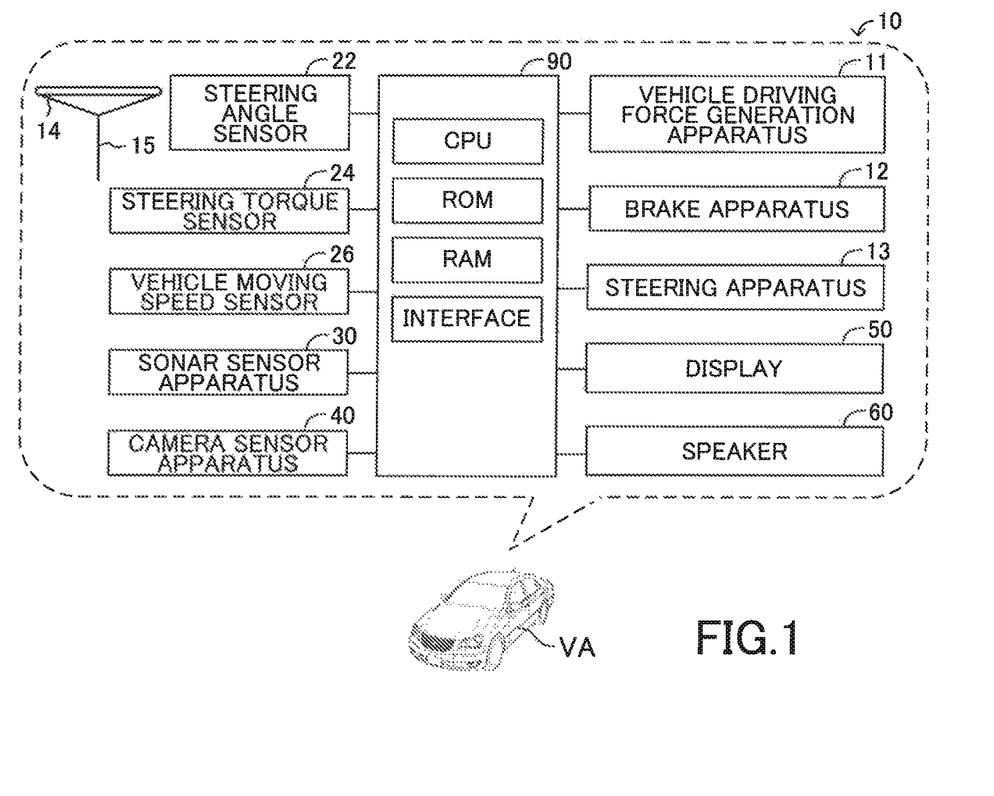
FIG. 1 is a general system configuration view showing a vehicle alert apparatus according to an embodiment of the invention.

Below, a vehicle alert apparatus according to an embodiment of the invention will be described with reference to the drawings. FIG. 1 shows the vehicle alert apparatus 10 according to the embodiment of the invention and a vehicle VA in which the vehicle alert apparatus 10 is installed.

As shown in FIG. 1, the vehicle alert apparatus 10 includes an ECU 90. ECU stands for electronic control unit. The ECU 90 includes a micro-computer as a main component. The micro-computer includes a CPU, a ROM, a RAM, a non-volatile memory, and an interface. The CPU is configured or programmed to realize various functions by executing instructions, programs, or routines memorized in the ROM.

The vehicle VA is installed with a vehicle driving force generation apparatus 11, a brake apparatus 12, and a steering apparatus 13. The vehicle driving force generation apparatus 11 generates driving forces for driving the vehicle VA and applies the generated driving forces to driven wheels of the vehicle VA. The vehicle driving force generation apparatus 11 is, for example, an internal combustion engine and/or an electric motor. he brake apparatus 12 applies braking forces for braking the vehicle VA to wheels of the vehicle VA. The steering apparatus 13 applies steering torques for steering the vehicle VA to steered wheels of the vehicle VA.

The vehicle driving force generation apparatus 11, the brake apparatus 12, and the steering apparatus 13 are electrically connected to the ECU 90. The ECU 90 controls activations of the vehicle driving force generation apparatus 11 to control the driving forces applied to the driven wheels of the vehicle VA. he ECU 90 controls activations of the brake apparatus 12 to control the braking forces applied to the wheels of the vehicle VA. The ECU 90 controls activations of the steering apparatus 13 to control the steering torques applied to the steered wheels of the vehicle VA.

<Sensors>

The vehicle alert apparatus 10 includes a steering angle sensor 22, a steering torque sensor 24, a vehicle moving speed sensor 26, a sonar sensor apparatus 30, a camera sensor apparatus 40, a display 50, and a speaker 60.

The steering angle sensor 22 is electrically connected to the ECU 90. The ECU 90 detects an angle θst of rotation of a steering wheel 14 relative to a neutral position by the steering angle sensor 22 and acquires the angle θst as a steering angle θst. When the steering wheel 14 is positioned at the center position, the steering angle θst is zero degrees. When the steering wheel 14 is rotated counterclockwise from the neutral position, the steering angle θst takes a positive value. When the steering wheel 14 is rotated clockwise from the neutral position, the steering angle θst takes a negative value.

The steering torque sensor 24 is electrically connected to the ECU 90. The ECU 90 detects a torque TQst input to a steering shaft 15 by a driver of the vehicle VA by the steering torque sensor 24 and acquires the torque TQst as a steering torque TQst.

The ECU 90 controls the activations of the steering apparatus 13 to apply the steering torque to the steered wheels of the vehicle VA, depending on the acquired steering angle θst and the acquired steering torque TQst.

The vehicle moving speed sensor 26 is electrically connected to the ECU 90. The ECU 90 detects rotation speeds Vrot of the wheels of the vehicle VA by the vehicle moving speed sensor 26. The ECU 90 acquires a moving speed SPD of the vehicle VA as a vehicle moving speed SPD, based on the acquired rotation speeds Vrot.

Figure 2:
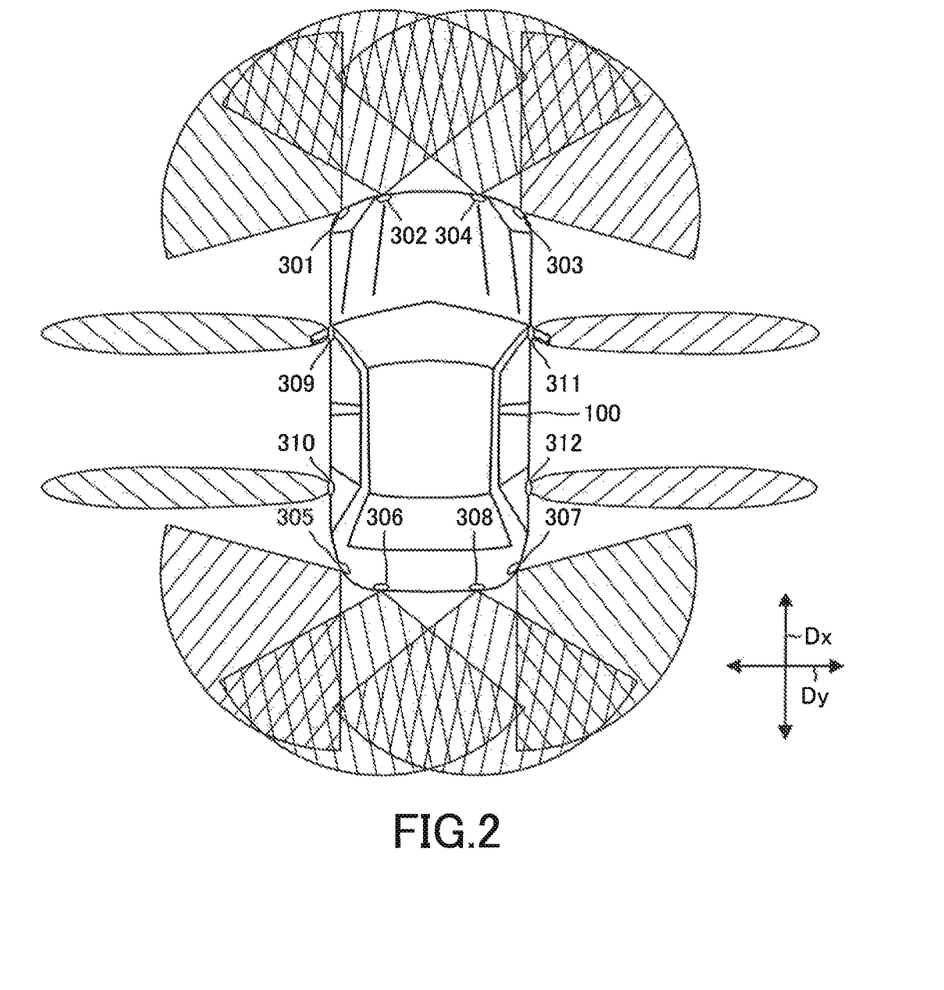
FIG. 2 is a view showing locations and detection areas of a sonar sensor apparatus.

The sonar sensor apparatus 30 includes a first clearance sonar 301 to a twelfth clearance sonar 312 as shown in FIG. 2.

As shown in FIG. 2, the first clearance sonar 301 is mounted on the vehicle VA so as to radiate sonic waves forward left from a left end FL of a front end portion of the vehicle VA. The second clearance sonar 302 is mounted on the vehicle VA so as to radiate the sonic waves forward straight from on a left side portion of the front end portion of the vehicle VA. The third clearance sonar 303 is mounted on the vehicle VA so as to radiate the sonic waves forward right from a right end FR of the front end portion of the vehicle VA. The fourth clearance sonar 304 is mounted on the vehicle VA so as to radiate the sonic waves forward straight from a right side portion of the front end portion of the vehicle VA.

The fifth clearance sonar 305 is mounted on the vehicle VA so as to radiate the sonic waves rearward left from a left end RL of a rear end portion of the vehicle VA. The sixth clearance sonar 306 is mounted on the vehicle VA so as to radiate the sonic waves rearward straight from a left side portion of the rear end portion of the vehicle VA. The seventh clearance sonar 307 is mounted on the vehicle VA so as to radiate the sonic waves rearward right from a right end RR of the rear end portion of the vehicle VA. The eighth clearance sonar 308 is mounted on the vehicle VA so as to radiate the sonic waves rearward straight from a right side portion of the rear end portion of the vehicle VA.

The ninth clearance sonar 309 is mounted on the vehicle VA so as to radiate the sonic waves leftward straight from a front side portion of a left end portion of the vehicle VA. The tenth clearance sonar 310 is mounted on the vehicle VA to radiate the sonic waves leftward straight from a rear side portion of the left end portion of the vehicle VA. The eleventh clearance sonar 311 is mounted on the vehicle VA so as to radiate the sonic waves rightward straight from a front side portion of a right end portion of the vehicle VA. The twelfth clearance sonar 312 is mounted on the vehicle VA so as to radiate the sonic waves rightward straight from a rear side portion of the right end portion of the vehicle VA.

The first clearance sonar 301 to the twelfth clearance sonar 312 receive the sonic waves reflected by objects.

The sonar sensor apparatus 30 is electrically connected to the ECU 90. The sonar sensor apparatus 30 sends object information to the ECU 90. The object information is information on (i) points of time of radiating the sonic waves from the first clearance sonar 301 to the twelfth clearance sonar 312, (ii) points of time of receiving the sonic waves by the first clearance sonar 301 to the twelfth clearance sonar 312, and (iii) frequencies of the sonic waves received by the first clearance sonar 301 to the twelfth clearance sonar 312. The ECU 90 acquires distances from the first clearance sonar 301 to the twelfth clearance sonar 312 to the object, based on (i) the points of time of radiating the sonic waves from the first clearance sonar 301 to the twelfth clearance sonar 312 and (ii) the points of time of receiving the sonic waves by the first clearance sonar 301 to the twelfth clearance sonar 312. Hereinafter, the acquired distance will be referred to as "the object distance Ld." Moreover, the ECU 90 acquires relative speeds Vr of the object relative to the clearance sonars 301 to 312, based on (i) the frequencies of the sonic waves radiated from and received by the clearance sonars 301 to 312 and (ii) the vehicle moving speed SPD.

A direction denoted by a symbol Dx shown in FIG. 2 is a longitudinal direction of the vehicle VA. Hereinafter, the direction Dx will be referred to as "the vehicle longitudinal direction Dx." A direction denoted by a symbol Dy shown in FIG. 2 is a width direction of the vehicle VA. Hereinafter, the direction Dy will be referred to as "the vehicle width direction Dy."

Figure 3:
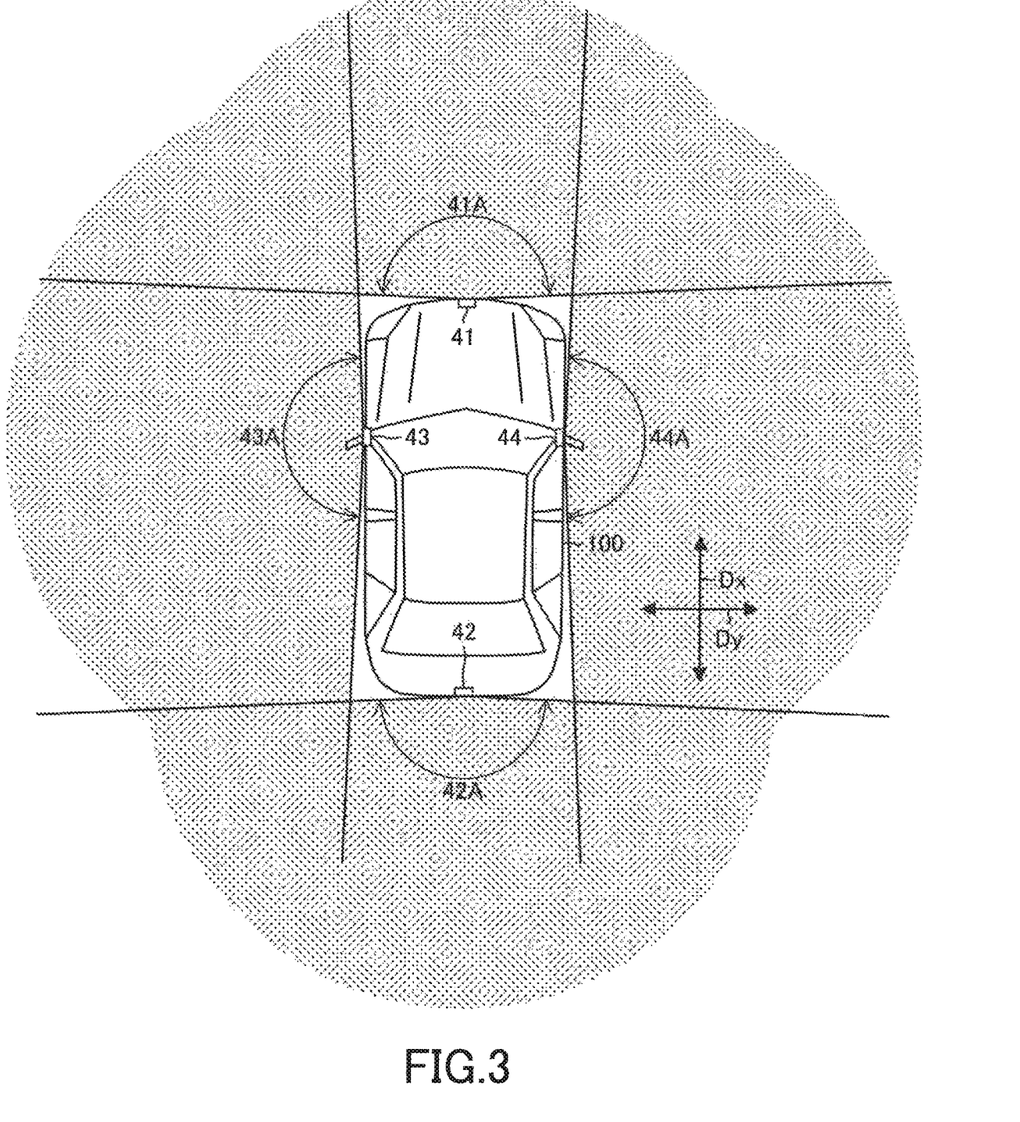
FIG. 3 is a view showing locations and image taking area of a camera sensor apparatus.

The camera sensor apparatus 40 includes a front camera 41, a rear camera 42, a left camera 43, and a right camera 44 as shown in FIG. 3. Hereinafter, the front camera 41, the rear camera 42, the left camera 43, and the right camera 44 will be collectively referred to as "the cameras 45."

As shown in FIG. 3, the front camera 41 is mounted on a center of the front end portion of the vehicle VA to take images of a view ahead of the vehicle VA. A field angle 41A of the front camera 41 is about 180 degrees. The rear camera 42 is mounted on a center of the rear end portion of the vehicle VA to take images of a view behind the vehicle 100. A field angle 42A of the rear camera 42 is about 180 degrees. The left camera 43 is mounted on the left end portion of the vehicle VA to take images of a view at the left of the vehicle 100. A field angle 43A of the left camera 43 is about 180 degrees. The right camera 44 is mounted on the right end portion of the vehicle VA to take images of a view at the right of the vehicle 100. A field angle 44A of the right camera 44 is about 180 degrees.

The camera sensor apparatus 40 is electrically connected to the ECU 90. The ECU 90 acquires information or image data on the images of the views taken by the cameras 45 of the camera sensor apparatus 40.

The display 50 is provided at a portion of the vehicle VA where the driver can see. In this embodiment, the display 50 is a display of a so-called navigation apparatus.

Figure 4:
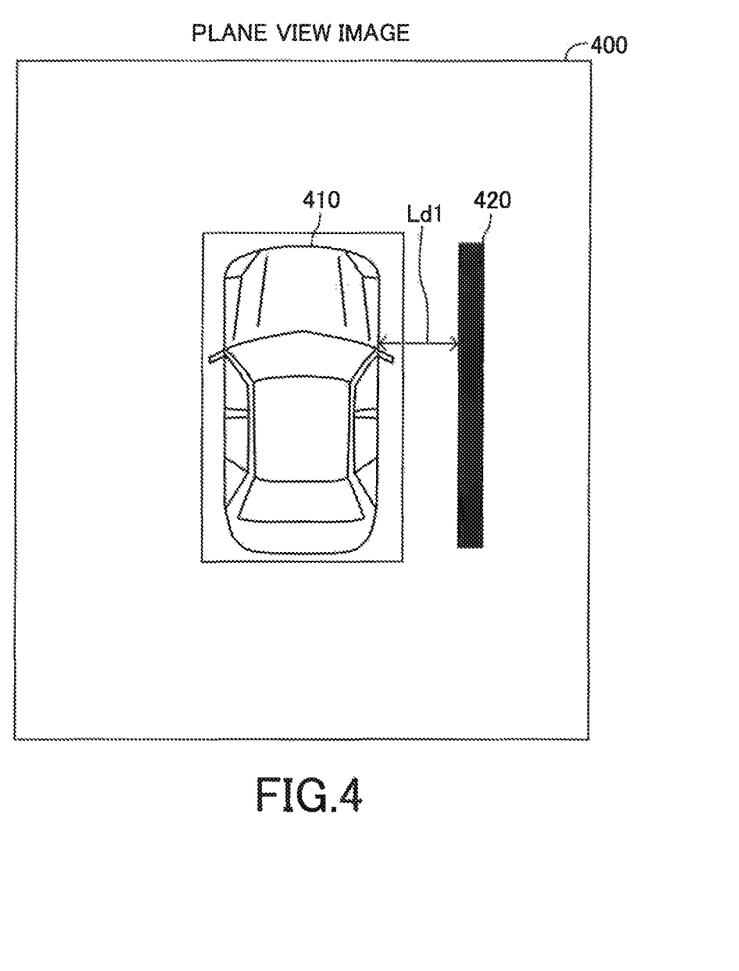
FIG. 4 is a view illustrating a plane view displayed on a display.

The display 50 is electrically connected to the ECU 90. The ECU 90 can cause the display 50 to display various images. In this embodiment, the ECU 90 can cause the display 50 to display a plane view image 400 as shown in FIG. 4.

The speaker 60 is provided in an interior of the vehicle VA and generates alert sounds described later in detail.

<Summary of Operations>

A summary of operations of the vehicle alert apparatus 10 will be described with reference to FIG. 4 and FIG. 5.

When the vehicle moving speed SPD becomes smaller than or equal to a threshold speed SPDth, the vehicle alert apparatus 10 displays the plane view image 400 on the display 50 as shown in FIG. 4. The plane view image 400 is an image of a view surrounding the vehicle VA, seeing from a plane view point located vertically above the vehicle VA. The plane view image 400 is produced, based on a three-dimensional synthetic image data produced, based on synthetic image data acquired by synthesizing image data acquired by the cameras. A vehicle icon 410 showing the vehicle VA is displayed at a center area of the plane view image 400.

The vehicle alert apparatus 10 determines whether there are alert objects in an area on the left side of the vehicle VA and an area on the right side of the vehicle VA. The alert object is an object satisfying a condition that the object distance Ld is shorter than or equal to a threshold object distance Ldth. Hereinafter, the area on the left side of the vehicle VA will be referred to as "the left area", and the area on the right side of the vehicle VA will be referred to as "the right area." When the vehicle alert apparatus 10 determines that there are at least one alert object, the vehicle alert apparatus 10 calculates a predicted moving route Rbp of the vehicle VA (see FIG. 6). The predicted moving route Rbp is a route which the vehicle VA predictively moves assuming that the vehicle VA moves with keeping the present steering angle Est and the present vehicle moving speed SPD. Then, the vehicle alert apparatus 10 presumes a passing area and determines whether the vehicle VA potentially collides with the alert objects, based on the passing area. The passing area is an area which the vehicle VA passes assuming the vehicle VA moves along the predicted moving route Rbp.

When the vehicle alert apparatus 10 determines that there is at least one alert object which the vehicle VA potentially collides with, the vehicle alert apparatus 10 calculates collision distances Lc. The collision distance Lc is a distance which the vehicle VA will move along the predicted moving route Rbp (see FIG. 6) until the vehicle VA collides with the alert object determined to potentially collide with the vehicle VA. Hereinafter, the alert object which the vehicle VA potentially collides with, will be referred to as "the collision object."

When (i) the collision distance Lc of the collision object is longer than a threshold collision distance Lcth, or (ii) there are the alert objects, but there are no collision objects, the vehicle alert apparatus 10 displays an alert bar colored in yellow (or a yellow alert bar or a first alert display element) on the plane view image 400 at a position corresponding to the object distance Ld of the collision object having the collision distance Lc longer than the threshold collision distance Lcth or (ii) the alert object which is not the collision object. In addition, the vehicle alert apparatus 10 generates alert sounds from the speaker 60 with an intermittent sound pattern to intermittently generate the alert sounds. Hereinafter, displaying the yellow alert bar and generating the alert sounds with the intermittent sound pattern, will be referred to as "the first alert."

On the other hand, when (i) there is at least one collision object, and (ii) the collision distance Lc of the collision object is shorter than or equal to the threshold collision distance Lcth (i.e., the alert condition is satisfied), the vehicle alert apparatus 10 displays the alert bar colored in red (or a red alert bar or a second alert display element) on the plane view image 400 at the position corresponding to the object distance Ld of the collision object. In addition, the vehicle alert apparatus 10 generates the alert sound from the speaker 60 with a continuous sound pattern to continuously generate the alert sound. Hereinafter, displaying the red alert bar and generating the alert sound with the continuous sound pattern, will be referred to as "the second alert." It should be noted that in some cases, a condition that the collision distance Lc is smaller than or equal to the threshold collision distance Lcth will be referred to as "a second alert condition" or "a high level alert condition."

In general, people tend to pay much attention to red color than yellow color. Therefore, an alert level of the red alert bar to alert the driver is higher than the alert level of the yellow alert bar. Moreover, people tend to pay much attention to the continuous sound pattern than the intermittent sound pattern. Therefore, the alert level of the continuous sound pattern is higher than the alert level of the intermittent sound pattern. Thus, the alert level of the second alert is higher than the alert level of the first alert.

Figure 5:
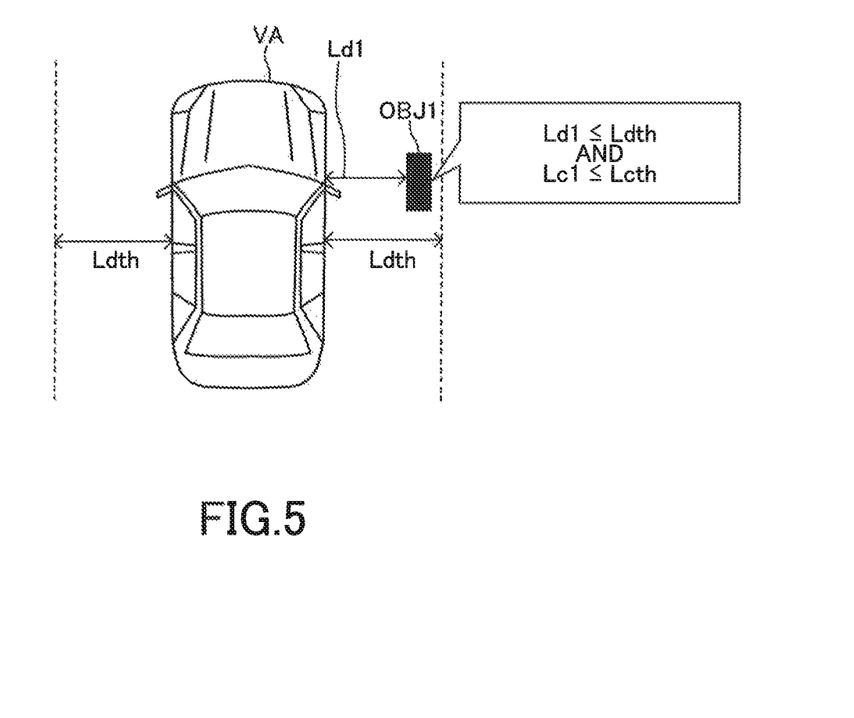
FIG. 5 is a view illustrating a relationship in position between a vehicle and an object.

In an example shown in FIG. 5, the object OBJ1 in the right area of the vehicle VA is detected. Assuming that (i) the object distance Ld1 of the object OBJ1 is shorter than or equal to the threshold object distance Ldth, and (ii) the collision distance Lc1 of the object OBJ1 is shorter than the threshold collision distance Lcth, the vehicle alert apparatus 10 displays the red alert bar 420 on the plane view image 400 at the position corresponding to the object distance Ld1 as shown in FIG. 4 and generates the alert sound from the speaker 60 with the continuous sound pattern.

Figure 6:
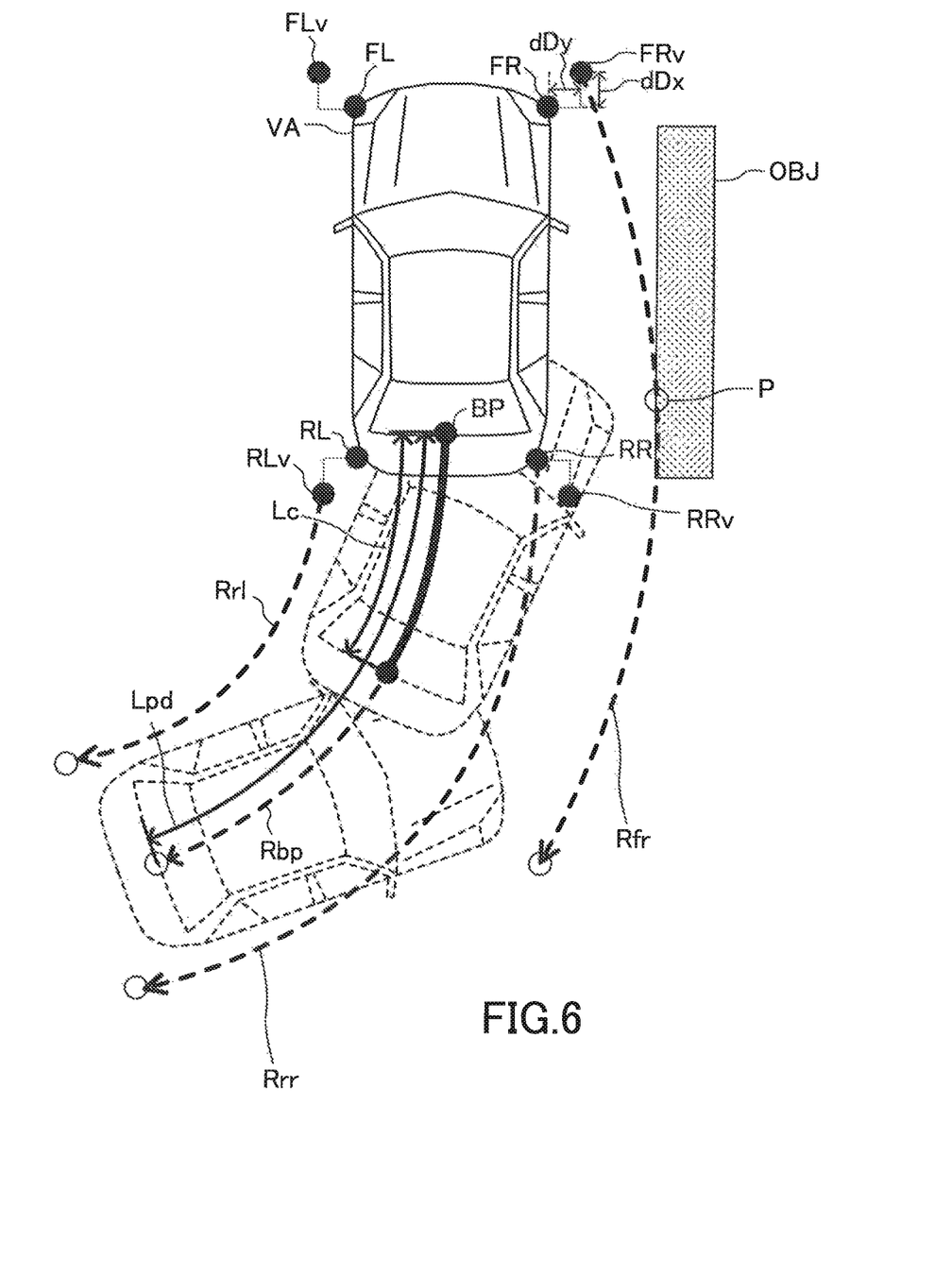
FIG. 6 is a view illustrating processes to calculate a collision distance.

The collision distance Lc will be described with reference to FIG. 6. When there is the alert object, the vehicle alert apparatus 10 calculates a moving trajectory of a center point BP between the left and right rear wheels of the vehicle VA in the vehicle width direction Dy as the predicted moving route Rbp, assuming that the vehicle VA moves or travels with keeping the present steering angle θst and the vehicle moving speed SPD. Hereinafter, the center point BP will be referred to as "the reference point BR." The calculated predicted moving route Rbp corresponds to a route having a predetermined distance Lpd.

Next, the vehicle alert apparatus 10 presumes the passing area, based on the predicted moving route Rbp. In particular, the vehicle alert apparatus 10 calculates (i) a moving trajectory Rfr of a theoretical right end FRv of the front end portion of the vehicle VA, (ii) a moving trajectory Rfl (not shown) of a theoretical left end FIN of the front end portion of the vehicle VA, (iii) the moving trajectory Rrr of a theoretical right end RRv of the rear end portion of the vehicle VA, and (iv) the moving trajectory Rrl of a theoretical left end RLv of the rear end portion of the vehicle VA, assuming that the vehicle VA moves with keeping the present steering angle θst and the present vehicle moving speed SPD. Then, the vehicle alert apparatus 10 presumes the passing area, based on the moving trajectories Rfr, Rfl, Rrr, and Rrl.

The theoretical right end FRv is a point located (i) at a predetermined distance dDx from the right end FR of the front end portion of the vehicle VA in a forward direction of the vehicle longitudinal direction Dx and (ii) at a predetermined distance dDy from the right end FR of the front end portion of the vehicle VA in a rightward direction of the vehicle width direction Dy. The theoretical left end FIN is a point located (i) at the predetermined distance dDx from the left end FL of the front end portion of the vehicle VA in the forward direction of the vehicle longitudinal direction Dx and (ii) at the predetermined distance dDy from the left end FL of the front end portion of the vehicle VA in a leftward direction of the vehicle width direction Dy. The theoretical right end RRv is a point located (i) at the predetermined distance dDx from the right end RR of the rear end portion of the vehicle VA in a rearward direction of the vehicle longitudinal direction Dx and a (ii) t the predetermined distance dDy from the right end RR of the rear end portion of the vehicle VA in the rightward direction of the vehicle width direction Dy. The theoretical left end RLv is a point located (i) at the predetermined distance dDx from the left end RL of the rear end portion of the vehicle VA in the rearward direction of the vehicle longitudinal direction Dx and (ii) at the predetermined distance dDy from the left end RL of the rear end portion of the vehicle VA in the leftward direction of the vehicle width direction Dy.

When at least a part of the object OBJ is located in the passing area, the vehicle alert apparatus 10 determines that the object OBJ is the collision object which the vehicle VA potentially collides with. A part of the object OBJ shown in FIG. 6 is located on the moving trajectory Rfr. Thus, the object OBJ shown in FIG. 6 is the collision object.

Then, the vehicle alert apparatus 10 acquires (i) a distance which the vehicle VA has moved along the predicted moving route Rbp until the vehicle VA collides with the collision object or (ii) a distance which the vehicle VA has moved along the predicted moving route Rbp until the vehicle VA moves to a position closest to the collision object, as the collision distance Lc. In an example shown in FIG. 6, the vehicle VA (in particular, the right end FR) moves to the position closest to the object OBJ at a point P on the moving trajectory Rfr. The collision distance Lc corresponds to a distance Lc which the reference point BP of the vehicle VA has moved along the predicted moving route Rbp until the theoretical right end FRv moving along the moving trajectory Rfr reaches the point P.

As described above, the vehicle alert apparatus 10 performs the alert regarding the alert object having the object distance Ld shorter than or equal to the threshold object distance Ldth. When the alert object does not satisfy the second alert condition that the collision distance Lc is shorter than or equal to the threshold collision distance Lcth, the vehicle alert apparatus 10 performs the first alert regarding the alert object. On the other hand, when the alert object satisfies the second alert condition, the vehicle alert apparatus 10 performs the second alert having the higher alert level than the alert level of the first alert, regarding the alert object. Thereby, the second alert is performed only regarding the object having a relatively high level of collision potential of colliding with the vehicle VA. Thus, bothering the driver by the second alert can be prevented.

<Specific Operations>

Figure 7:
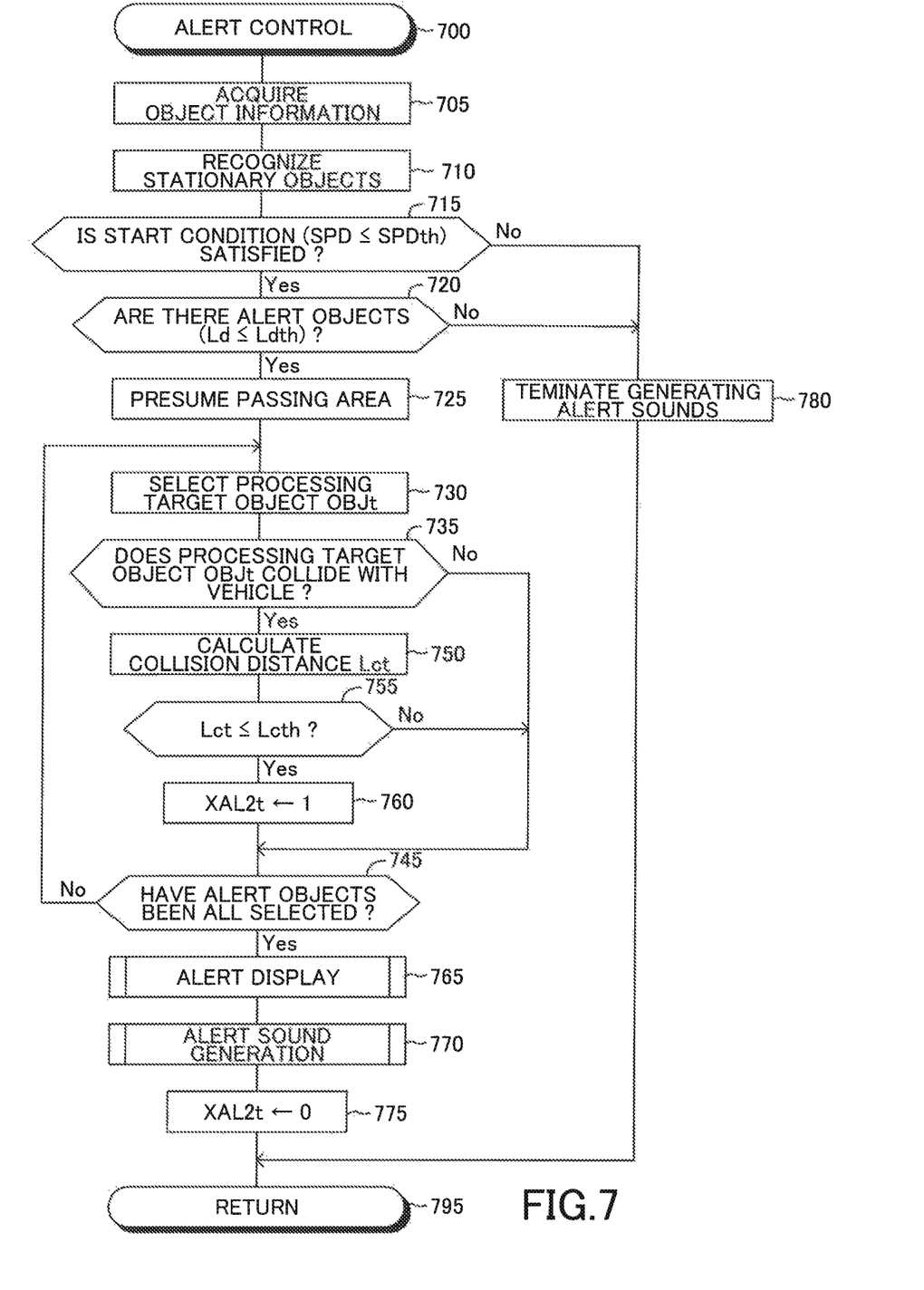
FIG. 7 is a view showing a flowchart of a routine executed by a CPU of an ECU shown in FIG. 1.

The CPU of the ECU 90 is configured or programmed to execute an alert control routine shown by a flowchart in FIG. 7 each time a predetermined time elapses.

Therefore, at a predetermined timing, the CPU starts to execute a process from a step 700 shown in FIG. 7 and sequentially executes processes of steps 705 and 710 described below. Then, the CPU proceeds with the process to a step 715.

Step 705: The CPU acquires the object information from the ninth clearance sonar 309 to the twelfth clearance sonar 312 mounted on the left side portion and the right side portion of the vehicle VA.

Step 710: The CPU recognizes stationary objects, based on the object information acquired at the step 705.

A process of the step 710 will be described in detail. The CPU acquires the object distances Ld and the relative speeds Vr of the objects, based on the object information. Then, the CPU recognizes the stationary objects as objects which this routine targets, based on the vehicle moving speed SPD and the relative speeds Vr of the objects. The object information is acquired from the ninth clearance sonar 309 to the twelfth clearance sonar 312 at the step 705. Thus, the objects which this routine targets, are the objects in the left and right areas of the vehicle VA.

Step 715: The CPU determines whether a start condition that the vehicle moving speed SPD is smaller than or equal to the threshold speed SPDth, is satisfied.

When the CPU determines that the start condition is satisfied, the CPU determines "Yes" at the step 715 and proceeds with the process to a step 720. At the step 720, the CPU determines that there are the alert objects which satisfy the alert condition that the object distance Ld is smaller than or equal to the threshold object distance Ldth.

When the CPU determines that there are the alert objects, the CPU determines "Yes" at the step 720 and proceeds with the process to a step 725 to calculate the predicted moving route Rbp and presume the passing area. Then, the CPU proceeds with the process to a step 730. At the step 730, the CPU selects a processing target object OBJt from the alert objects. Then, the CPU proceeds with the process to a step 735 to determine whether the processing target object OBJt selected this time potentially collides with the vehicle VA, i.e., the processing target object OBJt selected this time is the collision object, based on (i) the passing area presumed at the step 725 and (ii) a position of the processing target object OBJt relative to the vehicle VA.

When the CPU determines that the processing target object OBJt selected this time does not potentially collide with the vehicle VA, i.e., the processing target object OBJt selected this time is not the collision object, the CPU determines "No" at the step 735 and proceeds with the process to a step 745 to determine whether to have selected all the alert objects as the processing target objects OBJt.

When the CPU determines not having selected all the alert objects as the processing target objects OBJt, the CPU returns the process to the step 730 to newly select the processing target object OBJt from the alert objects which have not been selected as the processing target objects OBJt. Then, the CPU proceeds with the process to the step 735.

When the processing target object OBJt newly selected this time potentially collides with the vehicle VA, the CPU determines "Yes" at the step 735 and proceeds with the process to a step 750. At the step 750, the CPU calculates the collision distance Lct of the processing target object OBJt as described with reference to FIG. 6. Then, the CPU proceeds with the process to a step 755.

At the step 755, the CPU determines whether the second alert condition that the collision distance Lct is smaller than or equal to the threshold collision distance Lcth, is satisfied. If the collision distance Lct of the processing target object OBJt is longer than the threshold collision distance Lcth, the CPU determines "No" at the step 755 and proceeds with the process to a step 745.

When any one of the alert objects has not been selected as the processing target object OBJt, the CPU determines "No" at the step 745 and returns the process to the step 730 to newly select the processing target object OBJt. If (i) the processing target object OBJt newly selected this time potentially collides with the vehicle VA, and (ii) the collision distance Lct of the processing target object OBJt newly selected this time is smaller than or equal to the threshold collision distance Lcth, the CPU determines "Yes" at the steps 735 and 755 and proceeds with the process to a step 760.

At the step 760, the CPU sets a value of a second alert flag XAL2t to "1" and proceeds with the process to a step 745. The second alert flag XAL2t is prepared for each alert object. The alert object which the value of the second alert flag XAL2t assigned to is "1", is the alert object satisfying the second alert condition. On the other hand, the alert object which the value of the second alert flag XAL2t assigned to is "0", is the alert object not satisfying the second alert condition.

When the alert objects have been all selected as the processing target objects OBJt, the CPU determines "Yes" at the step 745 and sequentially executes processes of steps 765 to 775 described below. Then, the CPU proceeds with the process to a step 795 to terminate executing this routine once.

Step 765: The CPU executes an alert display process described later.

Step 770: The CPU executes an alert sound generation process described later.

Step 775: The CPU sets the values of the second alert flags XAL2t to "0."

When the CPU proceeds with the process to the step 715, and the start condition is not satisfied, the CPU determines "No" at the step 715 and proceeds with the process to a step 780. At the step 780, when the alert sound is generated with any of the intermittent sound pattern and the continuous sound pattern, the CPU stops or terminates generating the alert sound and proceeds with the process to the step 795 to terminate executing this routine once.

When the CPU proceeds with the process to the step 720, and there are no alert objects, the CPU determines "No" at the step 720 and proceeds with the process to the step 780.

<Alert Display Process>

Figure 8:
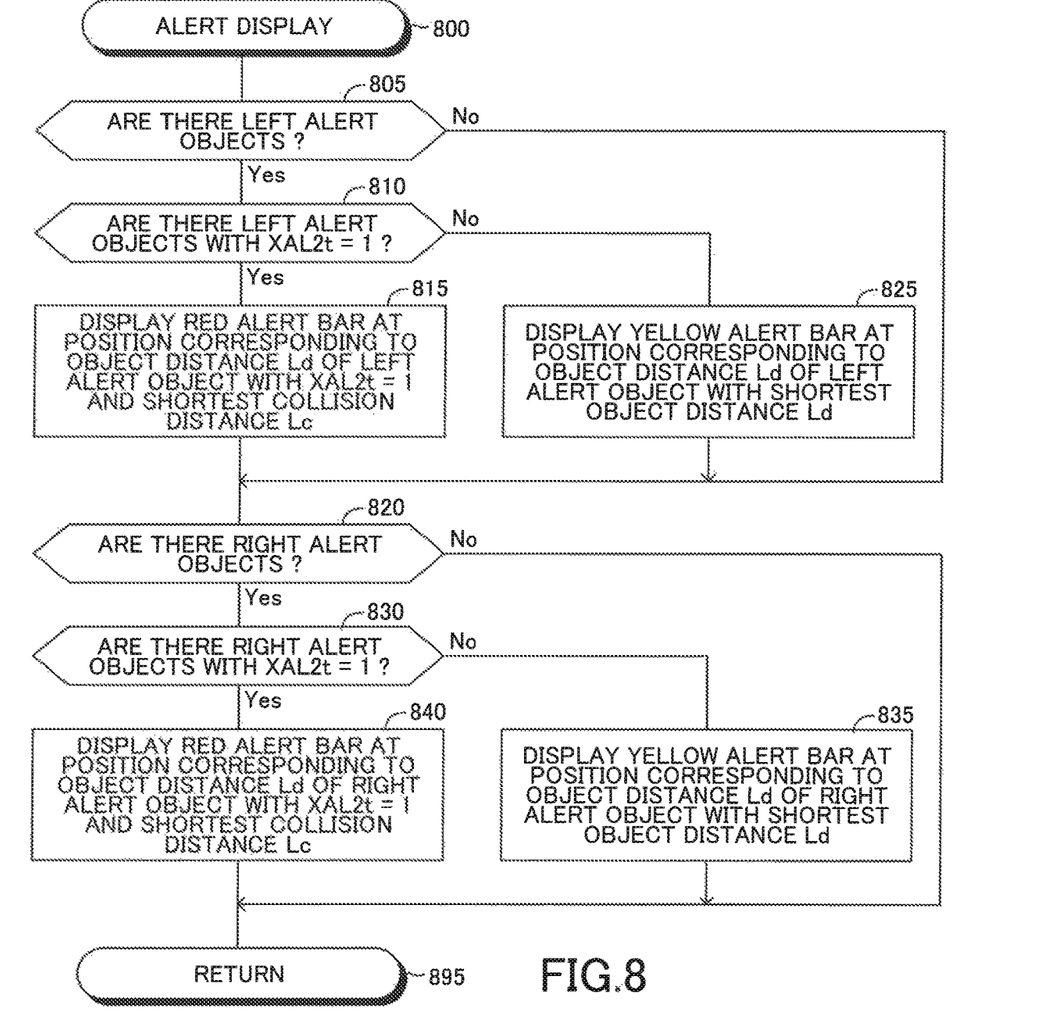
FIG. 8 is a view showing a flowchart of a routine executed by the CPU as an alert display process of the routine shown in FIG. 7.

When the CPU proceeds with the process to the step 765 shown in FIG. 7, the CPU starts to execute a process of a sub-routine shown by a flowchart in FIG. 8 and proceeds with the process to a step 805. At the step 805, the CPU determines whether there are the alert objects in the left area of the vehicle VA.

When the CPU determines that there are the alert objects in the left area of the vehicle VA, the CPU determines whether there are the alert objects which the values of the second alert flags XAL2t assigned to are "1" among the alert objects in the left area of the vehicle VA. Hereinafter, the alert object in the left area of the vehicle VA will be referred to as "the left alert object."

When the CPU determines that there are the alert objects which the values of the second alert flags XAL2t assigned to are "1", the CPU determines "Yes" at the step 810 and proceeds with the process to a step 815. At the step 815, the CPU selects the left alert object having the shortest collision distance Lc from among the left alert objects which the values of the second alert flags XAL2t assigned to, are "1." In addition, at the step 815, the CPU displays the red alert bar 420 on the plane view image 400 at the position corresponding to the object distance Ld of the left alert object having the shortest collision distance Lc. Then, the CPU proceeds with the process to a step 820.

At the step 820, the CPU determines whether there are the alert objects in the right area of the vehicle VA. When the CPU determines that there are no alert objects in the right area of the vehicle VA, the CPU determines "No" at the step 820 and proceeds with the process to a step 895 to terminate executing this routine once.

When the CPU proceeds with the process to the step 810 and determines that there are no left alert objects which the values of the second alert flags XAL2t assigned to are "1", the CPU determines "No" at the step 810 and proceeds with the process to a step 825.

At the step 825, the CPU selects the left alert object having the shortest object distance Ld from among the left alert objects. The CPU determines "No" at the step 810. Thus, when the CPU proceeds with the process to the step 825, the left alert objects all do not satisfy the second alert condition. In addition, at the step 825, the CPU displays the yellow alert bar on the plane view image 400 at the position corresponding to the object distance Ld of the left alert object having the shortest object distance Ld. Then, the CPU proceeds with the process to the step 820.

On the other hand, when the CPU proceeds with the process to the step 805 and determines that there are no left alert objects, the CPU determines "No" at the step 805 and proceeds with the process to the step 820.

On the other hand, when the CPU proceeds with the process to the step 820 and determines that there are the alert objects in the right area of the vehicle VA, the CPU determines "Yes" at the step 820 and proceeds with the process to a step 830. At the step 830, the CPU determines whether there are the alert objects which the values of the second alert flags XAL2t assigned to are "1" among the alert objects in the right area of the vehicle VA. Hereinafter, the alert object in the right area of the vehicle VA will be referred to as "the right alert object."

When the CPU determines that there are no right alert objects which the values of the second alert flags XAL2t assigned to are "1", the CPU determines "No" at the step 830 and proceeds with the process to a step 835. At the step 835, the CPU selects the right alert object having the shortest object distance Ld from among the right alert objects. The CPU determines "No" at the step 830. Thus, when the CPU proceeds with the process to the step 835, the right alert objects all do not satisfy the second alert condition. In addition, at the step 835, the CPU displays the yellow alert bar on the plane view image 400 at the position corresponding to the object distance Ld of the right alert object having the shortest object distance Ld. Then, the CPU proceeds with the process to the step 895 to terminate executing this routine once.

On the other hand, when the CPU proceeds with the process to the step 830 and determines that there are the right alert objects which the values of the second alert flags XAL2t assigned to are "1", the CPU determines "Yes" at the step 830 and proceeds with the process to a step 840. At the step 840, the CPU selects the right alert object having the shortest collision distance Lc from among the right alert objects which the values of the second alert flags XAL2t assigned to are "1." In addition, at the step 840, the CPU displays the red alert bar 420 on the plane view image 400 at the position corresponding to the object distance Ld of the right alert object having the shortest collision distance Lc. Then, the CPU proceeds with the process to the step 895 to terminate executing this routine once.

As described above, even when there are the plural alert objects in the left area of the vehicle VA, only one alert bar is displayed on the plane view image 400 at a left side position of the vehicle icon 410. Thereby, the plural alert bars are not displayed on the plane view image 400 at the left side position of the vehicle icon 410. Thus, the driver can easily realize which of the alert objects the driver should pay attention. Similarly, even when there are the plural alert objects in the right area of the vehicle VA, only one alert bar is displayed on the plane view image 400 at a right side position of the vehicle icon 410. In addition, the red alert bar is displayed in preference to the yellow alert bar. Thus, the vehicle alert apparatus 10 can cause the driver to surely pay attention to the alert object having the highest level of the collision potential in the left and right areas.

<Alert Sound Generation Process>

Figure 9:
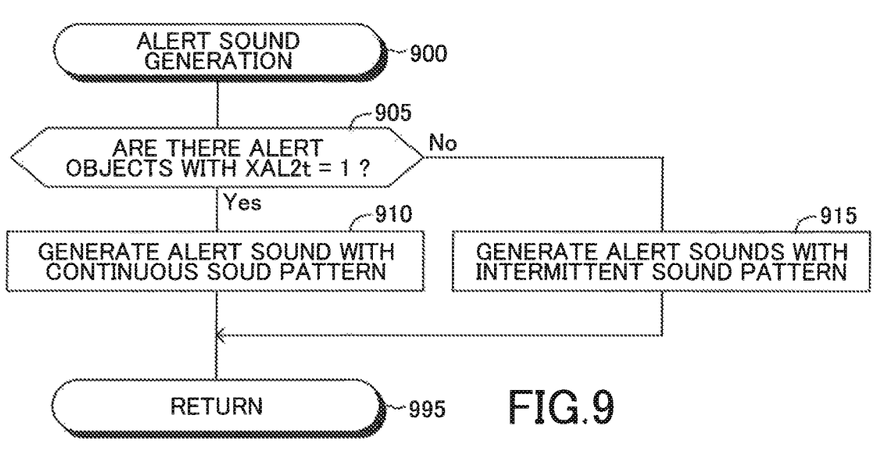
FIG. 9 is a view showing a flowchart of a routine executed by the CPU as an alert sound generation process of the routine shown in FIG. 7.

When the CPU proceeds with the process to the step 770 shown in FIG. 7, the CPU starts to execute a process of a sub-routine shown by a flowchart in FIG. 9 and proceeds with the process to a step 905. At the step 905, the CPU determines whether there are the alert objects which the values of the second alert flags XAL2t assigned to are "1."

When the CPU determines that there are the alert objects which the values of the second alert flags XAL2t assigned to are "1", the CPU determines "Yes" at the step 905 and proceeds with the process to a step 910 to generate the alert sound from the speaker 60 with the continuous sound pattern. Then, the CPU proceeds with the process to a step 995 to terminate executing this routine once.

On the other hand, when the CPU determines that there are no alert objects which the values of the second alert flags XAL2t assigned to are "1", the CPU determines "No" at the step 905 and proceeds with the process to a step 915 to generate the alert sounds from the speaker 60 with the intermittent sound pattern. Then, the CPU proceeds with the process to the step 995 to terminate executing this routine once. When the vehicle alert apparatus 10 generates the alert sounds with the intermittent sound pattern, the vehicle alert apparatus 10 starts to generate a predetermined alert sound and stops generating the alert sound at a point of time when a predetermined output amount of time elapses since the vehicle alert apparatus 10 starts to generate the alert sound. Then, the vehicle alert apparatus 10 starts to generate the alert sound again after a predetermined stop amount of time elapses since the vehicle alert apparatus 10 stops generating the alert sound. The intermittent sound pattern is described in detail in JP 2019-32744 A.

As described above, the vehicle alert apparatus 10 performs the first alert when there are the alert objects, but there are no alert objects satisfying the second alert condition. In addition, the vehicle alert apparatus 10 performs the second alert having the alert level higher than the alert level of the first alert when there are the alert objects satisfying the second alert condition. Thereby, the second alert is performed only when there are the alert objects having the high level of the collision potential. Thus, bothering the driver by the second alert can be prevented.

The invention is not limited to the embodiment, and various modifications can be employed within the scope of the invention.

The vehicle alert apparatus 10 presumes the passing area at the step 725 shown in FIG. 7, based on the moving trajectories Rfr, Rfl, Rrr, and Rrl of four points. In this regard, the vehicle alert apparatus 10 may presumes the passing area with methods other than the above-described method. For example, the vehicle alert apparatus 10 may modify the moving trajectories used to presume the passing area, depending on a sign of the steering angle θst and a moving direction of the vehicle VA.

In particular, when (i) the steering angle θst is positive, i.e., the steering wheel 14 is rotated counterclockwise from the neutral position, and (ii) the vehicle VA moves rearward (see FIG. 6), the vehicle alert apparatus 10 presumes an area at the side of the vehicle VA relative to the moving trajectory Rfr as the passing area. On the other hand, when (i) the steering angle θst is negative, and (ii) the vehicle VA moves rearward, the vehicle alert apparatus 10 presumes an area at the side of the vehicle VA relative to the moving trajectory Rfl as the passing area.

Moreover, when (i) the steering angle θst is positive, and (ii) the vehicle VA moves forward, the vehicle alert apparatus 10 presumes an area at the side of the vehicle VA relative to the moving trajectory Rrr as the passing area. On the other hand, when (i) the steering angle θst is negative, and (ii) the vehicle VA moves forward, the vehicle alert apparatus 10 presumes an area at the side of the vehicle VA relative to the moving trajectory Rrl as the passing area.

It should be noted that the vehicle alert apparatus 10 determines whether the vehicle VA moves forward or rearward, based on a shift position representing a position of a shift lever (not shown) operated by the driver and detected by a shift position sensor (not shown).

Further, according to the embodiment, the vehicle alert apparatus 10 is configured to display only one alert bar for each of the left and right areas on the plane view image 400. The invention is not limited thereto. For example, the vehicle alert apparatus 10 may display the plural red bars and the plural yellow bars for each of the left and right areas on the plane view image 400. Moreover, the vehicle alert apparatus 10 may display only one alert bar for only one of the left and right areas on the plane view image 400.

Furthermore, the yellow and red alert bars are described above as examples of the first and second alert display elements. In this regard, the first and second alert display elements may have various shapes. Moreover, according to the embodiment, a difference in alert level between the first and second alert display elements is derived from a difference in color between the first and second alert display elements. In this regard, the invention is not limited thereto. The difference in alert level between the first and second alert display elements may be derived from a difference in shape between the first and second alert display elements.

Furthermore, according to the embodiment, the first alert is to generate the alert sounds with the intermittent sound pattern, and the second alert is to generate the alert sound with the continuous sound pattern. Therefore, the difference in alert level is derived from a difference in sound pattern between the first and second alerts. In this regard, the invention is not limited thereto. For example, the difference in alert level may be derived from a difference in sound magnitude between the first and second alerts.

Furthermore, the vehicle alert apparatus 10 may cause the brake apparatus 12 to apply the braking forces to the wheels of the vehicle VA to avoid a collision of the vehicle VA with the alert object or reduce impact force derived from the collision of the vehicle VA with the alert object when there are the alert objects having the collision distance Lc shorter than or equal to a braking threshold distance Lcth' shorter than the threshold collision distance Lcth.

Furthermore, the vehicle alert apparatus 10 may set the predetermined stop amount of time such that the amount of time of stopping generating the alert sound with the intermittent sound pattern becomes small as the shortest object distance Ld becomes short.

Furthermore, the vehicle alert apparatus 10 may be applied to hybrid vehicles and electric vehicles.

Furthermore, the clearance sonars 301 to 312 may be replaced with any sensors which radiate wireless medium and receive the reflected wireless medium to detect obstacles. For example, the vehicle alert apparatus 10 may include infrared radars or millimeter wave radars in place of the clearance sonars 301 to 312.

Furthermore, the number of the cameras 45 and the clearance sonars 301 to 312 is not limited to the numbers shown in FIG. 2 and FIG. 3.

What is claimed is:

1. A vehicle alert apparatus installed in a vehicle, comprising:
    a vehicle moving speed sensor which detects a vehicle moving speed corresponding to a moving speed of the vehicle;
    a steering angle sensor which detects a steering angle of the vehicle;
    at least one detection sensor which detects information on at least one object in a predetermined detection area; and an electronic control unit which alerts a driver of the vehicle, wherein the electronic control unit is configured to:
(i) acquire the information on the at least one object detected by the at least one detection sensor as object information and (ii) acquire an object distance corresponding to a distance between the at least one object and the vehicle, based on the acquired object information;
presume a predicted moving route of the vehicle, based on the vehicle moving speed and the steering angle when the object distance is shorter than or equal to a threshold object distance;
calculate a collision distance corresponding to a distance which the vehicle has moves along the predicted moving route until the vehicle collides with the at least one object or the vehicle has moved to a position closest to the at least one object when the electronic control unit determines that the vehicle potentially collides with the at least one object, based on the predicted moving route;
perform a first alert when the collision distance is larger than a threshold collision distance; and
perform a second alert having a higher alert level of alerting the driver than the alert level of the first alert when the collision distance is shorter than or equal to the threshold collision distance.

2. The vehicle alert apparatus as set forth in claim 1, wherein:
the vehicle alert apparatus further comprises:
at least one camera sensor which takes images of a view surrounding the vehicle and acquires data on the taken images; and
a display which displays a vehicle surrounding image corresponding to an image of the view surrounding of the vehicle; and
the electronic control unit is configured to:
(i) acquire image data corresponding to data on the images acquired by the at least one camera sensor, (ii) produce the vehicle surrounding image, based on the acquired image data, and (iii) display the produced vehicle surrounding image on the display;
perform the first alert by displaying a first alert display element on the display at a position in the vehicle surrounding image corresponding to the object distance with overlapping the vehicle surrounding image; and
perform the second alert by displaying a second alert display element having the alert level higher than the alert level of the first alert display element, on the display at the position in the vehicle surrounding image corresponding to the object distance with overlapping the vehicle surrounding image.

3. The vehicle alert apparatus as set forth in claim 2, wherein:
the at least one object includes plural objects; and
the electronic control unit is configured to perform the second alert by displaying the second alert display element on the display at the position in the vehicle surrounding image corresponding to the object distance of the object having the shortest collision distance with overlapping the vehicle surrounding image when (i) the objects determined to potentially collide with the vehicle are at the same side of the vehicle, and (ii) the collision distances of all objects are smaller than or equal to the threshold collision distance.

4. The vehicle alert apparatus as set forth in claim 3, wherein:
the same side of the vehicle includes a left side and a right side of the vehicle.

5. The vehicle alert apparatus as set forth in claim 2, wherein:
the at least one object includes plural objects; and
the electronic control unit is configured to perform the second alert by displaying the second alert display element on the display at the position in the vehicle surrounding image corresponding to the object distance of the object having the collision distance shorter than or equal to the threshold collision distance with overlapping the vehicle surrounding image when (i) the objects determined to potentially collide with the vehicle are at the same side of the vehicle, (ii) a part of the collision distances is longer than the threshold collision distance, and (iii) the remaining of the collision distances is smaller than or equal to the threshold collision distance.

6. The vehicle alert apparatus as set forth in claim 5, wherein:
the same side of the vehicle includes a left side and a right side of the vehicle.

7. The vehicle alert apparatus as set forth in claim 1, wherein:
the vehicle alert apparatus further comprises a speaker which generates alert sounds; and
the electronic control unit is configured to:
perform the first alert by generating the alert sounds from the speaker with a first pattern; and
perform the second alert by generating the alert sounds from the speaker with a second pattern having the alert level higher than the alert level of the first pattern.

8. The vehicle alert apparatus as set forth in claim 1, wherein:
the electronic control unit is configured to perform the first alert when the electronic control unit determines that the vehicle does not collide with the at least one object, based on the predicted moving route.

9. The vehicle alert apparatus as set forth in claim 1, wherein:
the electronic control unit is configured to:
presume a vehicle body passing area corresponding to an area which a body of the vehicle has passed while the vehicle moves along the predicted moving route until the vehicle collides with the at least one object or the vehicle has moved to a position closest to the at least one object; and
determines that the vehicle potentially collides with the at least one object when the at least one object is in the vehicle body passing area.

10. The vehicle alert apparatus as set forth in claim 1, wherein:
the electronic control unit is configured to acquire the object distance when the at least one object is a stationary object.

11. The vehicle alert apparatus as set forth in claim 1, wherein:
the electronic control unit is configured to acquire the object distance when (i) the at least one object is a stationary object, and (ii) the vehicle moving speed is lower than or equal to a threshold speed.

12. The vehicle alert apparatus as set forth in claim 2, wherein:
the at least one object includes plural objects; and the electronic control unit is configured to perform the first alert by displaying the first alert display element on the display at the position in the vehicle surrounding image corresponding to the shortest object distance with overlapping the vehicle surrounding image when (i) the objects determined to potentially collide with the vehicle are at the same side of the vehicle, and (ii) the collision distances of all objects are longer than the threshold collision distance.

13. The vehicle alert apparatus as set forth in claim 12, wherein:

the same side of the vehicle includes a left side and a right side of the vehicle.

\* \* \* \* \*